(12) United States Patent
Ukita et al.

(10) Patent No.: US 9,371,054 B2
(45) Date of Patent: Jun. 21, 2016

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Masaru Ukita, Aichi-ken (JP); Wataru Yanagawa, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 146 days.

(21) Appl. No.: 14/208,263

(22) Filed: Mar. 13, 2014

(65) Prior Publication Data
US 2014/0263798 A1    Sep. 18, 2014

(30) Foreign Application Priority Data

Mar. 18, 2013  (JP) ................................ 2013-055369

(51) Int. Cl.
*B60R 22/38*  (2006.01)
*B60R 22/34*  (2006.01)
*B60R 22/28*  (2006.01)

(52) U.S. Cl.
CPC ......... *B60R 22/341* (2013.01); *B60R 2022/288* (2013.01)

(58) Field of Classification Search
USPC .............................................. 242/379.1, 374
See application file for complete search history.

(56) References Cited

U.S. PATENT DOCUMENTS

| 6,883,742 | B2* | 4/2005 | Sumiyashiki | ......... B60R 22/405 242/383.1 |
| 8,240,591 | B2* | 8/2012 | Aihara | ................ B60R 22/4676 242/374 |
| 2005/0284978 | A1* | 12/2005 | Zolkower | ............ B60R 22/3413 242/382.4 |
| 2008/0087754 | A1* | 4/2008 | Aihara | ................ B60R 22/4676 242/374 |
| 2011/0309181 | A1* | 12/2011 | Yanagawa | ........... B60R 22/3413 242/379.1 |
| 2012/0032018 | A1* | 2/2012 | Maekubo | ................ B60R 22/36 242/374 |
| 2012/0318903 | A1* | 12/2012 | Yanagawa | ............... B60R 22/28 242/379.1 |
| 2012/0318904 | A1* | 12/2012 | Ukita | .................. B60R 22/3413 242/379.1 |

FOREIGN PATENT DOCUMENTS

JP          2008174049 A     7/2008

* cited by examiner

*Primary Examiner* — Sang Kim
(74) *Attorney, Agent, or Firm* — Roberts Mlotkowski Safran & Cole P.C.

(57) ABSTRACT

In a webbing take-up device, a structure for interlocking a second lock pawl with a first lock pawl is only a shaft. It also suffices for switching between restricting of rotation of a lock ring and cancelling of the restricting to be carried out merely by moving a piston by gas pressure generated at a gas generator. In this way, by a simple structure, it is possible to switch between a mode, in which torsional deformation is brought about at a sub torsion main body of a sub torsion shaft, and a mode, in which torsional deformation is not brought about at the sub torsion main body of the sub torsion shaft.

4 Claims, 7 Drawing Sheets

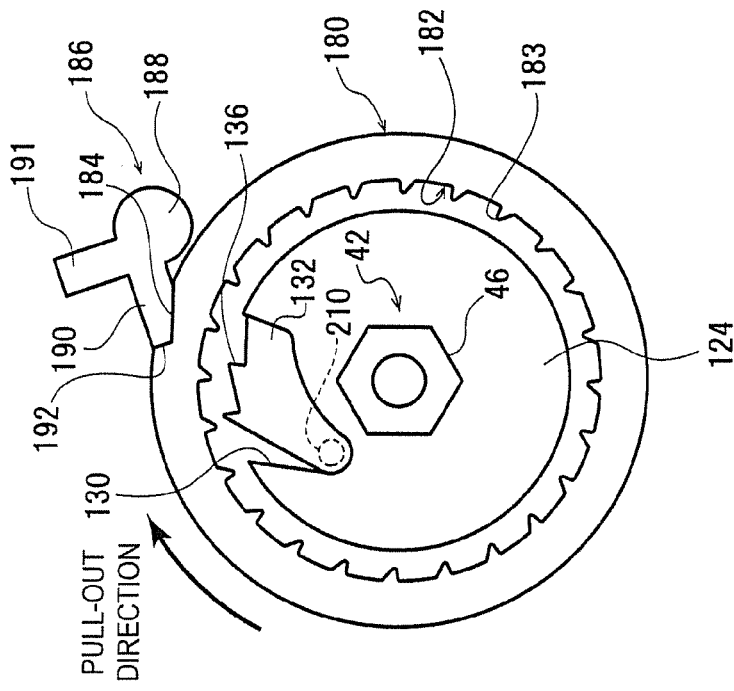
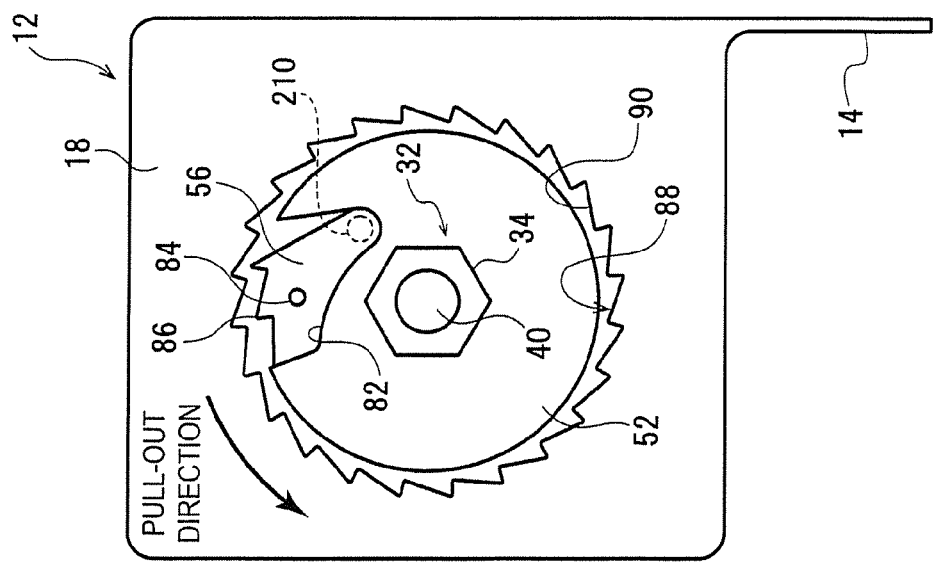

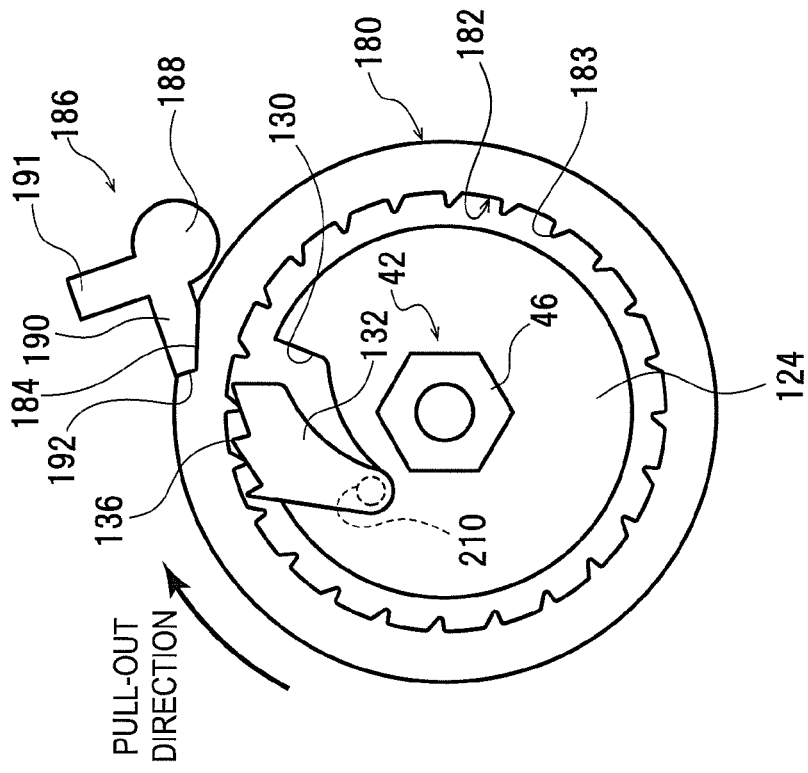
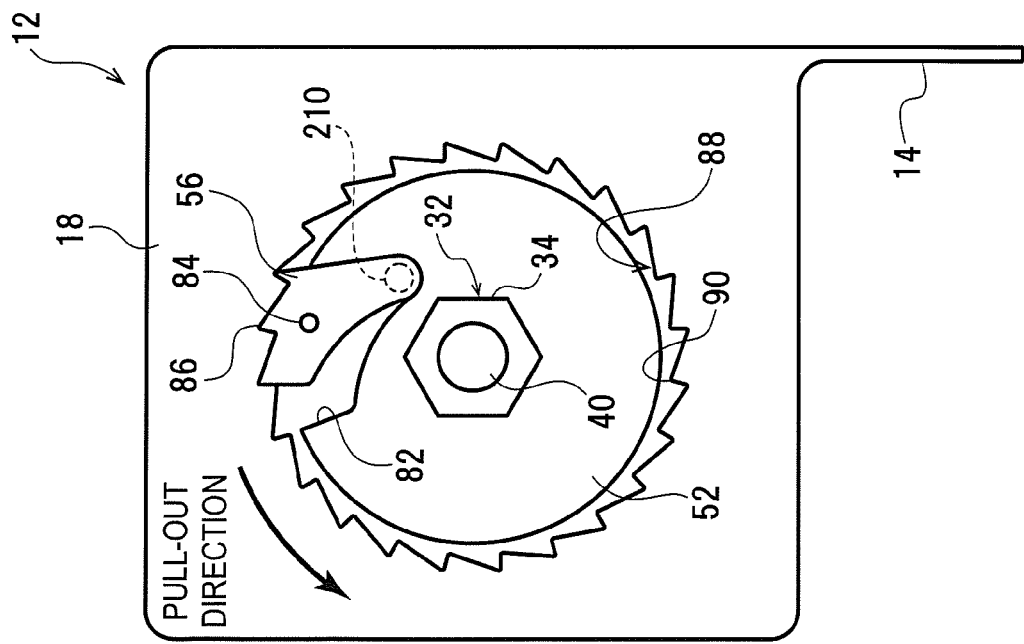
FIG.5B
FIG.5A

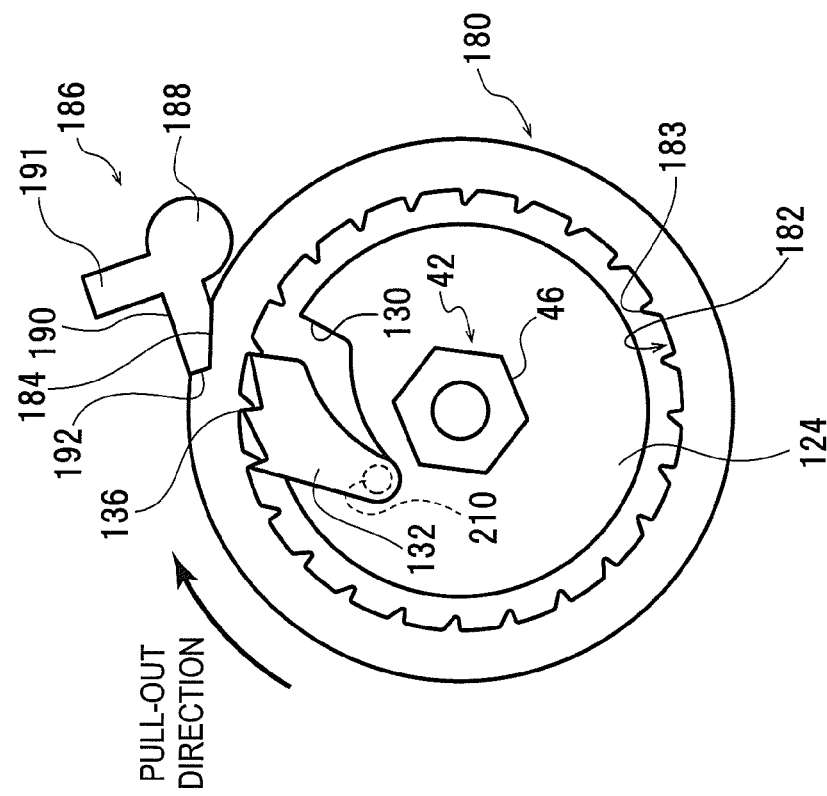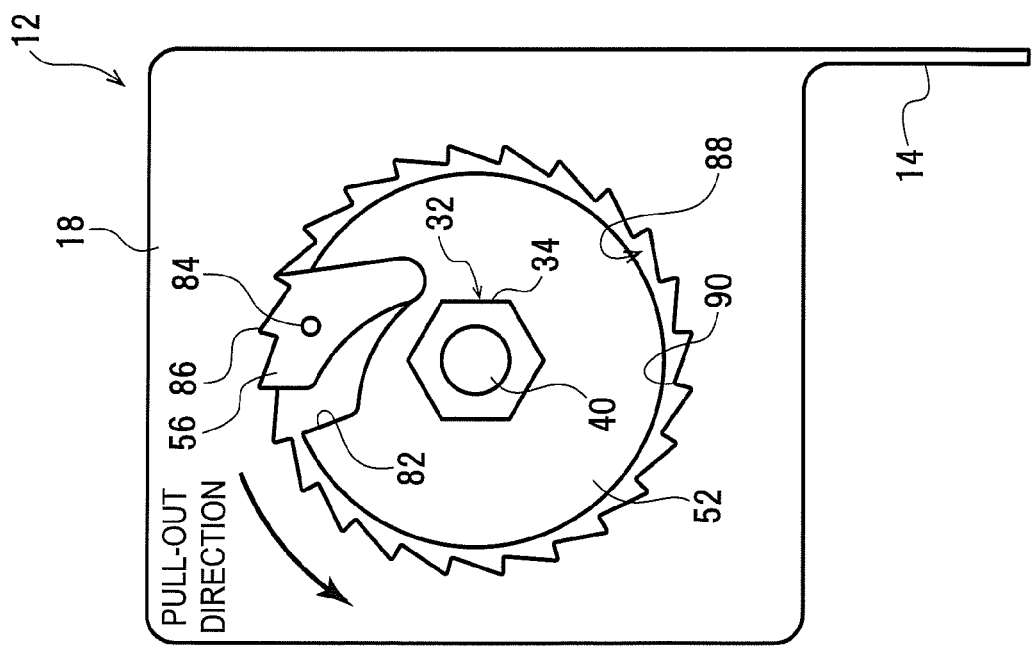

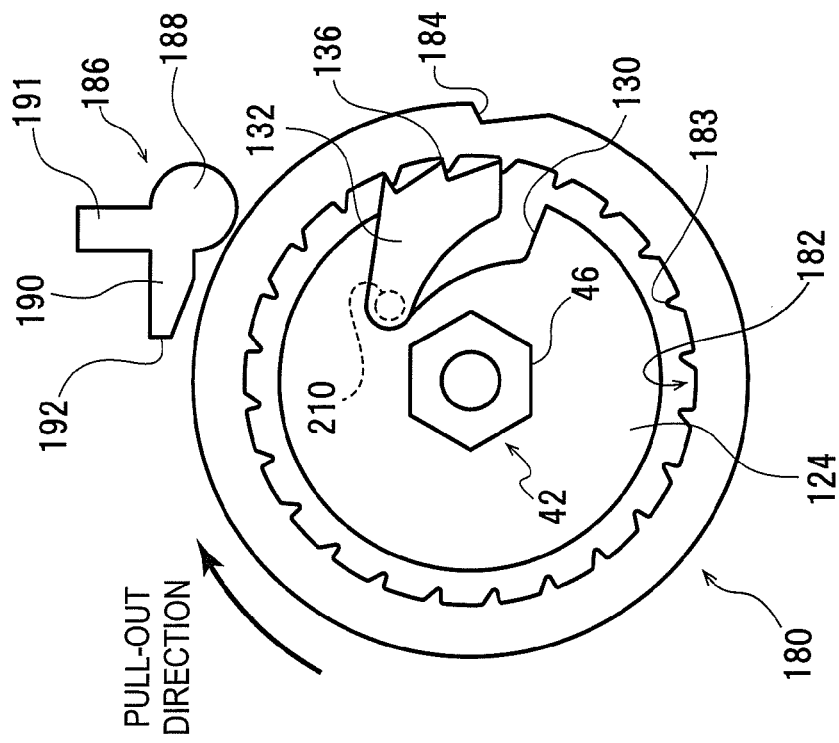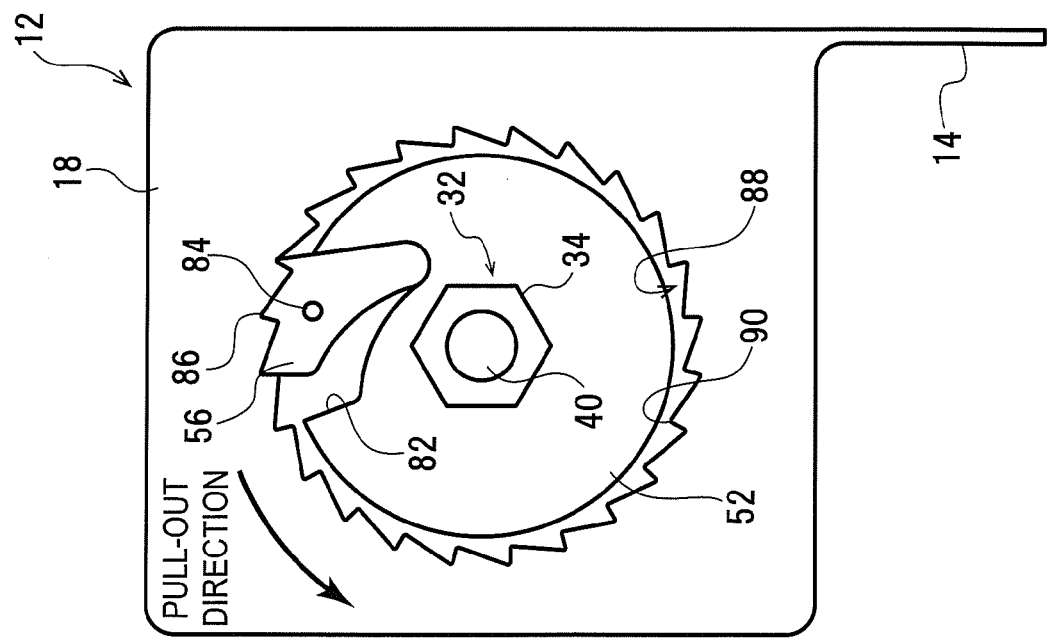

WEBBING TAKE-UP DEVICE

CROSS-REFERENCE TO RELATED APPLICATION

This application claims priority under 35 USC 119 from Japanese Patent Application No. 2013-055369 filed Mar. 18, 2013, the disclosure of which is incorporated by reference herein.

BACKGROUND

1. Field of the Invention

The present invention relates to a webbing take-up device that takes up a webbing of a seatbelt device of a vehicle.

2. Related Art

The webbing take-up device disclosed in Japanese Patent Application Laid-Open (JP-A) No. 2008-174049 (called a "retractor for a seat belt" in JP-A No. 2008-174049) has a first torsion bar and a second torsion bar at which the settings of the energy absorbing loads due to torsional deformation differ from one another, and that is structured so as to switch from a mode, in which rotational force is not transmitted to a second torsion bar, to a mode, in which rotational force is transmitted to the second torsion bar, by a switching device that actuates after actuation of a pretensioner.

However, the aforementioned switching device requires various types of members such as a locking element, a spindle ring and the like. Further, the aforementioned mode switching cannot be carried out if there are not members such as a torque tube and the like in addition to the switching device. In this way, in the structure disclosed in JP-A No. 2008-174049, the structure for switching the mode is complex.

SUMMARY

In view of the above, the present invention provides a webbing take-up device that has a simple structure for switching between a mode, in which torsional deformation arises at a second energy absorbing member, and a mode, in which torsional deformation does not arise at the second energy absorbing member.

A webbing take-up device relating to the present invention of a first aspect has: a spool that is provided at an inner side of a frame and that takes up a webbing; a first lock base that is provided, so as to be able to rotate relative to the spool, at one end side of the spool in an axial direction of the spool; a first energy absorbing member that is connected at an inner side of the spool, in a state in which relative rotation of the first energy absorbing member with respect to the spool is restricted, and that is connected at the one end side of the spool in the axial direction, in a state in which relative rotation of the first energy absorbing member with respect to the first lock base is restricted; a first lock pawl at whose distal end ratchet teeth are formed and that is provided at the first lock base so as to be able to rotate around a base end side of the first lock pawl, and, by rotating, the first lock pawl meshes with ratchet teeth formed at the frame and restricts rotation of the first lock base in a pull-out direction; a second lock base that is provided at another end side of the spool in the axial direction so as to be able to rotate relative to the spool; a second energy absorbing member that is connected at the inner side of the spool in a state in which relative rotation of the second energy absorbing member with respect to the spool is restricted, and that is connected at the another end side of the spool in the axial direction in a state in which relative rotation of the second energy absorbing member with respect to the second lock base is restricted; a lock ring that is provided rotatably at an outer side of the second lock base, and at whose inner peripheral portion ratchet teeth are formed; a second lock pawl at whose distal end ratchet teeth are formed and that is provided at the second lock base so as to be able to rotate around a base end side of the second lock pawl, the second lock pawl being configured to be able to mesh with the ratchet teeth of the lock ring by the second lock pawl rotating in a same direction as a rotation direction of the first lock pawl at a time when the first lock pawl meshes with the ratchet teeth of the frame, and the second lock pawl causing the lock ring to rotate in the pull-out direction integrally with the second lock base by the second lock pawl meshing with the ratchet teeth of the lock ring; a switching unit that has a restricting member restricting rotation of the lock ring in a state of being engaged with the lock ring, and that, by actuating, switches a state of engagement of the restricting member with respect to the lock ring; and a connecting member that is provided so as to pass through the spool in a direction along a central axis of the spool, and that connects the first lock pawl and the second lock pawl integrally, due to the spool rotating relative to the first lock base in the pull-out direction, a first lock pawl side of the connecting member breaking, and, due to the spool rotating relative to the second lock base in the pull-out direction, a second lock pawl side of the connecting member breaking.

In the webbing take-up device of the first aspect, the first lock base is provided at the one end side in the axial direction (the one axial direction end side) of the spool, and the first lock pawl is provided at this first lock base. When, due to the first lock pawl rotating, the ratchet teeth of the first lock pawl mesh-together with the ratchet teeth formed at the frame, rotation of the first lock base in the pull-out direction is restricted. The first lock base is connected to the spool via the first energy absorbing member in a state in which relative rotation of the first lock base with respect to the spool is restricted. Therefore, in this state, rotation of the spool in the pull-out direction is restricted, and the webbing being pulled-out from the spool is restricted.

When, in this state, the spool rotates in the pull-out direction, the connecting member breaks at the first lock pawl side. Due thereto, the connection between the connecting member and the first lock pawl is cancelled. Moreover, when the spool rotates in the pull-out direction with respect to the first lock base in this way, the first energy absorbing member is torsionally deformed.

On the other hand, in the present webbing take-up device, the second lock base is provided at the another end side in the axial direction (the another axial direction end side) of the spool, and the second lock pawl is provided at this second lock base. The second lock pawl is integrally connected to the first lock pawl by the connecting member. When the first lock pawl rotates in a direction of meshing-together with the ratchet teeth of the frame as described above, the second lock pawl becomes able to mesh-together with the ratchet teeth that are formed at the inner peripheral portion of the lock ring.

Further, the second lock base is connected to the spool in a state in which relative rotation of the second lock base with respect to the spool is restricted by the second energy absorbing member. Therefore, when the spool rotates in the pull-out direction as described above, the second lock base is rotated in the pull-out direction accompanying the second lock pawl. Due thereto, the second lock pawl meshes-together with the ratchet teeth of the lock ring.

Here, when, in this state, the restricting member of the switching unit is engaged with the lock ring, the lock ring cannot rotate in the pull-out direction, and accordingly, the second lock base cannot rotate in the pull-out direction. Therefore, when the spool rotates relative to the second lock base in the pull-out direction, the connecting member breaks at the second lock pawl side. Due thereto, the connection between the connecting member and the second lock pawl is cancelled. Moreover, when the spool rotates in the pull-out direction with respect to the second lock base in this way, torsional deformation arises at the second energy absorbing member.

Namely, in this state, when the spool rotates in the pull-out direction, both the first energy absorbing member and the second energy absorbing member are torsionally deformed. The webbing is pulled-out from the spool by an amount corresponding to the torsional deformation of the first energy absorbing member and the second energy absorbing member, and moreover, the passenger can move inertially toward the vehicle front by an amount corresponding thereto. Moreover, the webbing is pulled by the body of the passenger, and a portion of this tensile (pull) load is provided to and absorbed by the torsional deformation of the first energy absorbing member and the second energy absorbing member.

On the other hand, in the state in which the restricting member of the switching unit is not engaged with the lock ring, rotation of the lock ring is not restricted. Therefore, when rotation of the spool is transmitted to the second lock base via the second energy absorbing member and, moreover, is transmitted to the lock ring via the second lock pawl, the lock ring rotates in the pull-out direction together with the second lock base, and accordingly, the spool. Therefore, in this state, torsional deformation arises only at the first energy absorbing member. In this state, the webbing is pulled-out from the spool by an amount corresponding to the amount of torsional deformation of the first energy absorbing member, and moreover, the passenger can inertially move toward the vehicle front by an amount corresponding thereto. Moreover, the webbing is pulled by the body of the passenger, and a portion of this tensile (pull) load is provided to and absorbed by the torsional deformation of the first energy absorbing member.

In this way, in the webbing take-up device relating to the present invention, in the state in which the restricting member of the switching unit is engaged with the lock ring, a larger amount of energy can be absorbed as compared with a state in which the restricting member of the switching unit is not engaged with the lock ring.

Here, in the webbing take-up device relating to the present invention, the second lock pawl is interlocked with the first lock pawl due to the second lock pawl being integrally connected to the first lock pawl by the connecting member. Moreover, when the spool rotates relative to the first lock base or the second lock base, the connecting member breaks. Therefore, by a simple structure, the second lock pawl can be rotated, and the second lock base and the lock ring can be connected. Accordingly, merely by switching whether or not the rotation of the lock ring is to be restricted by the restricting member, it is possible to switch between the mode, in which torsional deformation is brought about at the second energy absorbing member, and the mode, in which torsional deformation is not brought about at the second energy absorbing member.

In a webbing take-up device relating to the present invention of a second aspect, in the present invention of the first aspect, the lock ring is set in a state in which phase of the ratchet teeth of the lock ring is offset with respect to phase of the ratchet teeth of the frame, and, in a state in which the second lock pawl is rotated interlockingly with the first lock pawl, the ratchet tooth of the second lock pawl is positioned between adjacent teeth of the ratchet teeth of the lock ring.

In the webbing take-up device of the second aspect, the lock ring is set, in the initial state, in a state in which the phase of the ratchet teeth of the lock ring are offset with respect to the phase of the ratchet teeth of the frame. Due thereto, when the second lock pawl rotates interlockingly with the first lock pawl, the ratchet teeth of the first lock pawl mesh-together with the ratchet teeth of the frame, but the ratchet teeth of the second lock pawl are respectively positioned between adjacent teeth of the ratchet teeth of the lock ring, and, in this state, the second lock pawl does not mesh-together with the ratchet teeth of the lock ring. In this way, in the webbing take-up device relating to the present invention, the meshing-together of the ratchet teeth of the first lock pawl and the ratchet teeth of the frame is not affected by the meshing-together of the ratchet teeth of the second lock pawl and the ratchet teeth of the lock ring.

In a webbing take-up device relating to the present invention of a third aspect, the present invention of the first or second aspect further has an abutment portion that is provided at at least one of the one end side or the another end side of the spool, that abuts the connecting member from a side of a take-up direction that is opposite a pull-out direction, and that restricts movement of the connecting member in the take-up direction.

In the webbing take-up device of the third aspect, when the spool rotates in the pull-out direction relative to the first lock base or the second lock base, shearing load in the pull-out direction is applied from the spool to the first lock pawl side (i.e., the one end side of the spool) or the second lock pawl side (i.e., the other end side of the spool) of the connecting member. Here, the abutment portion is provided at at least one of the one end side or the another end side of the spool. Therefore, the abutment portion abuts the connecting member from the take-up direction side. Thus, movement of the connecting member in the take-up direction is restricted by the abutment portion. Due thereto, the connecting member is easily broken by receiving shearing load from the spool.

As described above, the webbing take-up device relating to the present invention can make simple the structure for switching between a mode, in which torsional deformation arises at a second energy absorbing member, and a mode, in which torsional deformation does not arise at the second energy absorbing member.

BRIEF DESCRIPTION OF THE DRAWINGS

An embodiment of the invention will be described in detail with reference to the following figures, wherein:

FIG. 4A is a side view showing an initial state of a first lock base and the first lock pawl, and FIG. 4B is a side view showing an initial state of a second lock base and the second lock pawl;

FIGS. 5A and 5B are side views that correspond to FIGS. 4A and 4B and show a state in which the first lock pawl is meshed-together with ratchet teeth of a frame;

FIGS. 6A and 6B are side views that correspond to FIGS. 4A and 4B and that show a state in which, from the state shown in FIGS. 5A and 5B, the second lock base has rotated in a pull-out direction and the second lock pawl is meshed-together with ratchet teeth of a lock ring; and FIGS. 7A and 7B are side views that correspond to FIGS. 6A and 6B and that show a state in which restricting of rotation of the lock ring by a restricting member is cancelled and the lock base has rotated in the pull-out direction.

DETAILED DESCRIPTION

Structure of Present Embodiment

Figure 1:
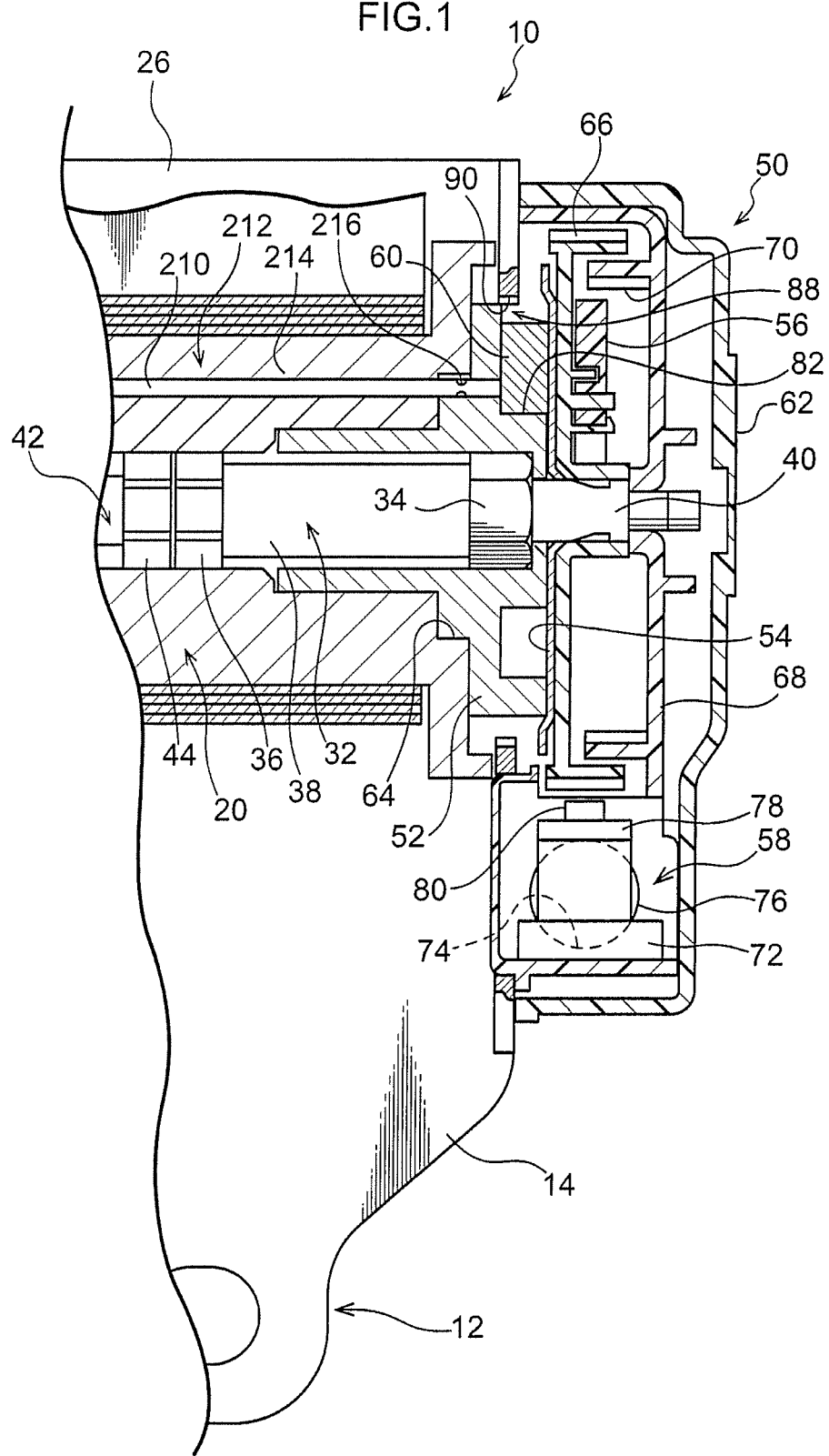
FIG. 1 is a front sectional view viewing a first lock base side of a webbing take-up device relating to the embodiment of the present invention.
Figure 2:
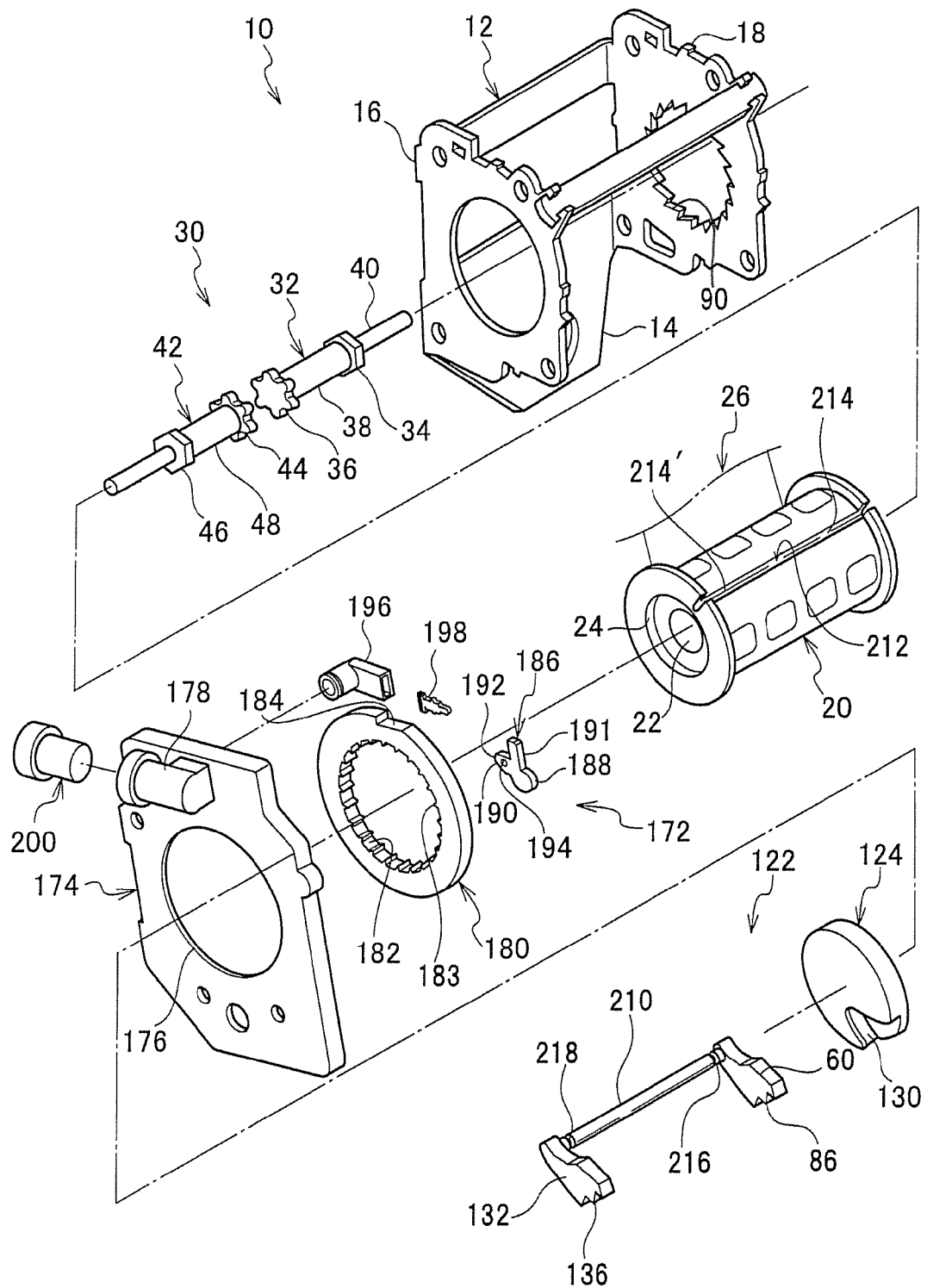
FIG. 2 is an exploded perspective view of a second lock base side of the webbing take-up device relating to the embodiment of the present invention.

As shown in FIG. 1 and FIG. 2, a webbing take-up device 10 relating to an embodiment of the present invention is structured to include a frame 12, a spool 20 that is substantially cylindrical tube shaped and is disposed at the inner side of the frame 12, a webbing 26 for restraining the body of a passenger, and a force limiter mechanism 30. Further, as shown in FIG. 1, a first lock mechanism 50 is provided at one axial direction side of the spool 20. As shown in FIG. 2, a second lock mechanism 122 and a switching mechanism 172 that serves as a switching unit are provided at the other axial direction side of the spool 20. The respective structures thereof are described hereinafter.

The frame 12 has a back plate 14 that is plate-shaped and is fixed to a vehicle body. Leg plates 16, 18 extend-out at substantial right angles from the both transverse direction end portions of the back plate 14.

The spool 20 is disposed between the leg plate 16 and the leg plate 18 such that the central axial direction of the spool 20 runs along the direction in which the leg plate 16 and the leg plate 18 face one another. A through-hole 22 is formed so as to pass-through the axially central portion of the spool 20. A main torsion shaft 32 and a sub torsion shaft 42 that are described later are inserted within this through-hole 22. The spool 20 is indirectly and rotatably supported at the frame 12 via the main torsion shaft 32 and the sub torsion shaft 42.

Further, a circular hole 24, in which a second lock base 124 of the second lock mechanism 122 that is described later is fit, is formed in the end portion at the leg plate 16 side of the spool 20. This circular hole 24 is formed, in cross-section, in the shape of a circle whose diameter is larger than that of the through-hole 22, and opens at the end portion at the leg plate 16 side of the spool 20. Further, the circular hole 24 is formed coaxially with respect to the through-hole 22, and the through-hole 22 opens at the bottom surface of the circular hole 24.

An engaged portion (not shown in the drawings), that is engaged with the main torsion shaft 32 and the sub torsion shaft 42 that are described later, is formed at the axial direction intermediate portion of the spool 20, within the through-hole 22 of the spool 20. As seen from the axial direction of the spool 20, the engaged portion is formed in a shape that can transfer torque, e.g., a spline shape or the like.

The webbing 26 is formed in the shape of an elongated belt. The base end portion of the webbing 26 is anchored on the spool 20. When the spool 20 rotates in a take-up direction, the webbing 26 is taken-up onto the outer peripheral portion of the spool 20.

(Structure of Force Limiter Mechanism 30)

The force limiter mechanism 30 is structured to include the main torsion shaft 32 that serves as a first energy absorbing member, and the sub torsion shaft 42 that serves as a second energy absorbing member.

The main torsion shaft 32 is formed overall in the shape of a rod whose lengthwise direction runs along the central axial direction of the spool 20. The main torsion shaft 32 is disposed at the leg plate 18 side of the inner side of the through-hole 22, coaxially with respect to the spool 20. The main torsion shaft 32 has a main torsion main body 38 that is rod-shaped. A first lock base side fixing portion 34 is formed at the leg plate 18 side of the main torsion main body 38. The outer peripheral shape of this first lock base side fixing portion 34 is formed in a non-circular shape such as, for example, a polygonal shape or a star shape or the like. In contrast, a spool side engaging portion 36 is formed at the leg plate 16 side of the main torsion main body 38. For example, the outer peripheral shape of the spool side engaging portion 36 is made to be a shape that can transfer torque, such as a spline shape or the like. The spool side engaging portion 36 engages with the inner peripheral portion of the through-hole 22 in a state in which relative rotation with respect to the spool 20 is restricted.

On the other hand, the sub torsion shaft 42 is formed overall in the shape of a rod whose lengthwise direction runs along the central axial direction of the spool 20. The sub torsion shaft 42 is disposed at the leg plate 16 side of the inner side of the through-hole 22, coaxially with respect to the spool 20. The sub torsion shaft 42 has a sub torsion main body 48 that is rod-shaped. A second lock base side fixing portion 46 is formed at the leg plate 16 side of the sub torsion main body 48. The outer peripheral shape of this second lock base side fixing portion 46 is formed in a non-circular shape such as, for example, a polygonal shape or a star shape or the like. In contrast, a spool side engaging portion 44 is formed at the leg plate 18 side of the sub torsion main body 48. The outer peripheral shape of the spool side engaging portion 44 is made to be a shape that can transfer torque, such as a spline shape or the like. The spool side engaging portion 44 engages with the inner peripheral portion of the through-hole 22 in a state in which relative rotation with respect to the spool 20 is restricted.

(Structure of First Lock Mechanism 50)

As shown in FIG. 1, the first lock mechanism 50 is structured to include a first lock base 52, a V gear 54, a W pawl 56, an acceleration sensor 58, and a first lock pawl 60. The entire first lock mechanism 50 is covered by a sensor cover 62 that is provided at the outer side of the leg plate 18.

A circular hole 64 is formed in the spool 20 so as to correspond to the first lock base 52. The circular hole 64 is formed, in cross-section, in the shape of a circle whose diameter is larger than that of the through-hole 22, and opens at the end portion at the leg plate 18 side of the spool 20. Further, the circular hole 64 is formed coaxially with respect to the through-hole 22, and the through-hole 22 opens at the bottom surface of the circular hole 64. The first lock base 52 is fit into the circular hole 64 so as to rotate freely. Moreover, the first lock base side fixing portion 34 of the main torsion shaft 32 is engaged with the first lock base 52, and, due thereto, relative rotation of the first lock base 52 with respect to the main torsion shaft 32 is restricted, and accordingly, relative rotation of the first lock base 52 with respect to the spool 20 is restricted.

The V gear 54 is provided at the first lock base 52 at the side opposite the side at which the spool 20 is located. The V gear 54 is supported so as to rotate freely at a shaft portion 40, the shaft portion 40 being formed at the main torsion shaft 32 at the side of the first lock base side fixing portion 34, which side is opposite the side at which the main torsion main body 38 is located. A compression coil spring is interposed between the V gear 54 and the first lock base 52. When the first lock base 52 rotates in a pull-out direction that is opposite to the aforementioned take-up direction, the compression coil spring pushes the V gear 54 and rotates the V gear 54 in the pull-out direction.

Further, when the first lock base 52 rotates in the pull-out direction in the state in which rotation of the V gear 54 in the pull-out direction is restricted, the aforementioned compression coil spring is compressively deformed. Due thereto, the first lock base 52 is able to rotate by a predetermined angle in the pull-out direction with respect to the V gear 54. Ratchet teeth 66 are formed at the outer peripheral portion of the V gear 54, and a claw 80 of a sensor pawl 78 of the acceleration sensor 58 that is described later oppose the ratchet teeth 66.

The W pawl 56 is swingably supported at the V gear 54 at a position that is offset, in the radial direction, from the central axis of the V gear 54. When the V gear 54 rotates in the pull-out direction that is opposite to the aforementioned take-up direction, the W pawl 56 attempts to stay due to inertia, and, due thereto, when relative rotation arises between the V gear 54 and the W pawl 56, the W pawl 56 engages with ratchet teeth 70 that are formed at a sensor holder 68 within the sensor cover 62. Due thereto, rotation of the V gear 54 in the pull-out direction is restricted.

The acceleration sensor 58 has a pedestal 72. The pedestal 72 has a curved surface 74 that is curved so as to open upwardly. A steel ball 76 that serves as an inertial mass body is placed on this curved surface 74. Further, the sensor pawl 78 is provided at the pedestal 72 so as to be able to rotate upward. The sensor pawl 78 hangs over the steel ball 76 from above. Therefore, when the steel ball 76 rolls on the curved surface 74 of the pedestal 72 and rises, the sensor pawl 78 is pushed upward by the steel ball 76 and rotates upward.

The claw 80 is formed at the sensor pawl 78. When the sensor pawl 78 is pushed upward by the steel ball 76 and rotates upward, the claw 80 approaches the outer peripheral portion of the V gear 54 and meshes together with the ratchet teeth 66 of the V gear 54. Due thereto, rotation of the V gear 54 in the pull-out direction is restricted.

Figure 3:
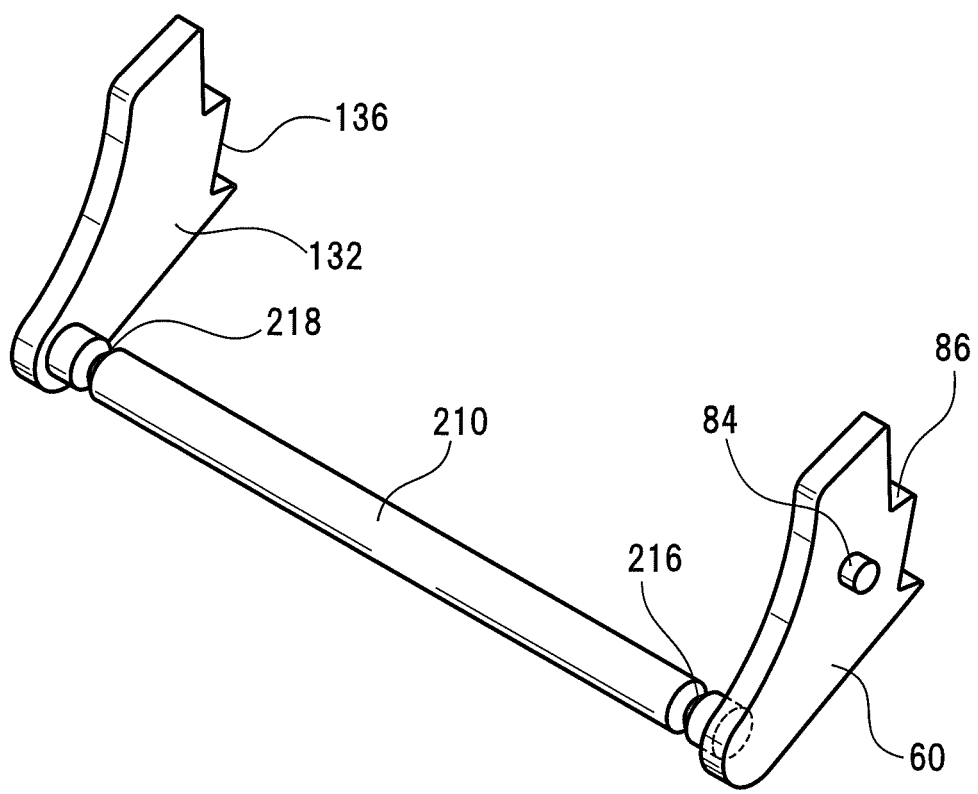
FIG. 3 is a perspective view in which a first lock pawl, a second lock pawl, and a connecting member are enlarged.

The first lock pawl 60 is provided within a pawl accommodating portion 82 that is formed in the first lock base 52. As shown in FIG. 3 and FIGS. 4A and 4B, a pin 84 is formed at the V gear 54 side of the first lock pawl 60. The pin 84 is entered and disposed in a guide groove that is formed in the V gear 54 and is not illustrated in the drawings. When the first lock base 52 rotates in the pull-out direction with respect to the V gear 54, the pin 84 rotates while being guided by the guide groove. Due thereto, the first lock pawl 60 rotates around the base end side thereof (a shaft 210 that is described later), and the distal end side of the first lock pawl 60 projects-out toward the outer side of the first lock base 52. Ratchet teeth 86 are formed at the distal end of the first lock pawl 60.

When the first lock pawl 60 rotates and the distal end side thereof projects-out toward the outer side of the first lock base 52, the ratchet teeth 86 mesh-together with ratchet teeth 90 that are formed in the inner peripheral portion of a ratchet hole 88 that is formed in the leg plate 18. Due thereto, rotation of the first lock base 52 in the pull-out direction is restricted, and moreover, rotation of the spool 20 in the pull-out direction is restricted.

(Structure of Second Lock Mechanism 122)
As shown in FIG. 2, the second lock mechanism 122 is structured to include the second lock base 124, a lock ring 180 and a second lock pawl 132, and is provided at the end portion at the leg plate 16 side of the spool 20.

The second lock base 124 is formed in a substantial disc shape, and is fit into the aforementioned circular hole 24 of the spool 20 so as to rotate freely. An engaging hole that is not shown in the drawings is formed in the axially central portion of this second lock base 124, and the second lock base side fixing portion 46 of the above-described sub torsion shaft 42 is fit in this engaging hole. Due thereto, relative rotation of the second lock base 124 with respect to the sub torsion shaft 42 is restricted.

The lock ring 180 is formed in the shape of a disc plate. A circular hole 182 that is coaxial with the outer peripheral portion of the lock ring 180 is formed in the lock ring 180. The second lock base 124 is positioned at the inner side of the circular hole 182. The lock ring 180 is provided coaxially with respect to the spool 20, and is supported at a body 174 of the switching mechanism 172, that is described later, so as to rotate freely. Ratchet teeth 183 are formed at the inner peripheral portion of the circular hole 182 of the lock ring 180.

In the present embodiment, the number of the ratchet teeth 183 is the same as the number of the ratchet teeth 90 of the aforementioned ratchet hole 88 (the leg plate 18). However, the dimension from the tooth base to the tooth tip of each of the ratchet teeth 183 is formed to be smaller than the dimension from the tooth base to the tooth tip of each of the ratchet teeth 90 at the ratchet hole 88. Therefore, the internal peripheral portion itself of the circular hole 182 each exists between a ratchet tooth 183 and a ratchet tooth 183 that are adjacent to one another.

The second lock pawl 132 is provided within a pawl accommodating portion 130 that is formed in the second lock base 124. The base end side of this second lock pawl 132 is connected to the aforementioned first lock pawl 60 by the shaft 210 that serves as a connecting member and is described later. Therefore, when the distal end side of the first lock pawl 60 rotates so as to project-out to the outer side of the first lock base 52, the second lock pawl 132 rotates around the shaft 210, and the distal end side of the second lock pawl 132 projects-out to the outer side of the second lock base 124.

Ratchet teeth 136 are formed at the distal end of the second lock pawl 132. When the second lock pawl 132 rotates and the distal end side thereof projects-out to the outer side of the second lock base 124, the ratchet teeth 136 approach the inner peripheral portion of the circular hole 182. Here, in its initial state, the lock ring 180 is provided in a state in which the phase of the ratchet teeth 183 is offset from the phase of the ratchet teeth 90 of the ratchet hole 88 (the leg plate 18). Therefore, if the first lock pawl 60 rotates and the ratchet teeth 86 mesh-together with the ratchet teeth 90 of the ratchet hole 88 (the leg plate 18), the tooth tip of the ratchet tooth 136 of the second lock pawl 132 is positioned between the ratchet tooth 183 and the ratchet tooth 183 that are adjacent to one another (the teeth tips of the ratchet teeth 136 of the second lock pawl 132 are respectively positioned between the ratchet teeth 183 and the ratchet teeth 183 that are adjacent to one another).

Namely, in this state, there is a state in which the ratchet teeth 136 of the second lock pawl 132 can mesh-together with the ratchet teeth 183 of the lock ring 180, but the ratchet tooth 136 of the second lock pawl 132 is not meshed-together with the ratchet tooth 183 of the lock ring 180 (the ratchet teeth 136 of the second lock pawl 132 are not meshed-together with the ratchet teeth 183 of the lock ring 180).

Note that in the present embodiment, it is preferable that the first lock pawl 60 and the second lock pawl 132 are provided at the shaft 210 such that the phase of the ratchet teeth 86 of the first lock pawl 60 and the phase of the ratchet teeth 136 of the second lock pawl 132 are the same (not offset). However, if the configuration, in which such as in the above state, when the first lock pawl 60 rotates and the ratchet teeth 86 mesh-together with the ratchet teeth 90 of the ratchet hole 88, there is the state in which the ratchet teeth 136 of the second lock pawl 132 can mesh-together with the ratchet teeth 183 of the lock ring 180, but the ratchet teeth 136 of the second lock pawl 132 are not meshed-together with the ratchet teeth 183 of the lock ring 180, is satisfied, relation between, in its initial state, the phase of the ratchet teeth 183 of the lock ring 180 and the phase of the ratchet teeth 90 of the ratchet hole 88, relation between the phase of the ratchet teeth 86 of the first lock pawl 60 and the phase of the ratchet teeth 136 of the second lock pawl 132, are not limited to the above mentioned configuration.

(Structure of Switching Mechanism 172)

As shown in FIG. 2, the switching mechanism 172 is structured to include the body 174, an FL pawl 186, a cylinder 196, a piston 198 and a gas generator 200, and is disposed at the leg plate 16 side of the frame 12.

The body 174 is formed substantially in the shape of a box that opens toward the leg plate 16 side, and is fixed to the outer side of the leg plate 16. Further, a circular hole 176 that is circular is formed so as to pass-through the bottom wall of the body 174, and the above-described lock ring 180 is supported so as to rotate freely. Further, a gas generator accommodating portion 178 is formed at the upper portion of the body 174 at a portion that is at the side opposite the side at which the leg plate 16 is located. The gas generator 200 that is described later is mounted to the gas generator accommodating portion 178. This gas generator accommodating portion 178 is formed substantially in the shape of a cylindrical tube having a bottom, and is disposed such that the axial direction thereof is the direction in which the leg plate 16 extends-out, and communicates with the cylinder 196 that is described later.

The FL pawl 186 is formed in a substantial plate shape, and is accommodated within the body 174 at the upper side of the lock ring 180. A pawl side shaft portion 188 that is substantially circular in cross-section is formed at the lower portion of the FL pawl 186. The pawl side shaft portion 188 is supported at the body 174 so as to rotate freely. Further, the FL pawl 186 has an arm portion 190 that is substantially L-shaped as seen from the leg plate 16 side.

A lock portion 192 is provided at the lower end portion of the arm portion 190. The lock portion 192 is disposed within an engaged portion 184 of the lock ring 180, and is engaged with the lock ring 180. Moreover, an anchor hole 194 that is circular in cross-section is formed so as to pass-through the lower portion of the arm portion 190. A shear pin (not shown in the drawings) that is provided at the body 174 is inserted through the interior of this anchor hole 194. Due thereto, rotation of the FL pawl 186 is restricted, and rotation of the lock ring 180 in the pull-out direction is impeded by the FL pawl 186.

On the other hand, there is a structure in which, due to rotational force acting on the FL pawl 186 and the FL pawl 186 breaking the shear pin of the body 174, the engagement between the FL pawl 186 and the engaged portion 184 is cancelled, and rotation of the lock ring 180 in the pull-out direction is permitted.

The cylinder 196 is formed in the shape of a tube that is substantially L-shaped as seen in plan view, and is accommodated within the body 174 at a position that is at the take-up direction side of the FL pawl 186. The cylinder 196 communicates with the gas generator accommodating portion 178.

The piston 198 is formed in a substantially parallelepiped shape. One end portion of the piston 198 is disposed at the side of an upper end portion 191 of the arm portion 190 of the FL pawl 186, and the other end portion of the piston 198 is inserted within the cylinder 196. Further, there is a structure in which the piston 198 is moved due to the operation of the gas generator 200 that is described later.

The gas generator 200 is formed in a substantially solid cylindrical shape, and is disposed within the gas generator accommodating portion 178 of the body 174. This gas generator 200 is electrically connected to an ECU (not shown in the drawings) of the vehicle. Further, there is a structure in which, when the gas generator 200 is operated by the ECU, the gas generator 200 generates gas, and this gas is supplied to the interior of the cylinder 196, and the piston 198 is moved toward the upper end portion 191 side of the FL pawl 186.

The gas generator 200 is electrically connected to a physique detecting unit via the ECU that serves as a control unit (neither is shown in the drawings). The physique detecting unit detects the physique of the passenger seated in the seat by, for example, a load sensor, a belt sensor, a seat position sensor, or the like. For example, in a case in which the physique detecting unit is structured by a load sensor, the physique detecting unit detects the load that is applied to the seat of the vehicle. On the basis of an electric signal from the load sensor, the ECU judges the physique of the passenger, and judges whether or not to operate the gas generator 200.

(Structure of Shaft 210)

Here, as described above, the base end side of the first lock pawl 60 and the base end side of the second lock pawl 132 are integrally connected by the shaft 210. As shown in FIG. 3, the shaft 210 is formed in the shape of a round rod whose central axis is set in the same direction as the central axis of the spool 20. One end of the shaft 210 is connected to the base end side of the first lock pawl 60, and the other end is connected to the base end side of the second lock pawl 132. The shaft 210 is disposed at the inner side of a shaft accommodating portion 212 that is formed in the spool 20.

At this shaft accommodating portion 212, the wall surface at the take-up direction side is an abutting portion 214. The abutting portion 214 abuts the outer peripheral portion of the shaft 210 from the take-up direction side, and suppresses movement of the shaft 210 in the take-up direction with respect to the spool 20. Further, reduced diameter portions 216, 218, each of which is an aspect of a weak portion, are formed at the shaft 210. The reduced diameter portions 216, 218 are formed to be more narrow than the other portions of the shaft 210 (dimensions of the reduced diameter portions 216, 218 are formed to be smaller than the other portions of the shaft 210), and therefore, have lower mechanical strength than the other portions of the shaft 210.

Note that, as shown in FIGS. 1 and 2, the abutting portion 214 is provided at the one end side of the spool 20, however, it can be provided at the another end side of the spool 20 (see 214' in FIG. 2). Further, it is possible that the both abutting portions 214 and 214' are provided at the one end side and the another end side of the spool 20, or that the abutting portion which is located from the one end side to the another end side of the spool 20 is provided at the spool 20.

The position at which the reduced diameter portion 216 is formed is set so as to be positioned at one axial direction end of the spool 20 in the state in which the shaft 210 is disposed at the inner side of the shaft accommodating portion 212. In contrast, the position at which the reduced diameter portion 218 is formed is set so as to be positioned at the other axial direction end of the spool 20 in the state in which the shaft 210 is disposed at the inner side of the shaft accommodating portion 212.

<Operation, Effects of Present Embodiment>

The operation and effects of the present embodiment are described next.

(Operations of First Lock Mechanism 50 and Second Lock Mechanism 122)

In the present webbing take-up device 10, when the vehicle enters into a state of rapid deceleration, the steel ball 76 of the acceleration sensor 58 rolls on the curved surface 74 of the pedestal 72 and rises due to inertia. Due thereto, the sensor pawl 78 rotates upward, and the claw 80 of the sensor pawl 78 meshes-together with the ratchet teeth 66 of the V gear 54. Due thereto, rotation of the V gear 54 in the pull-out direction is restricted.

On the other hand, when the body of the passenger inertially moves toward the vehicle front due to the vehicle decelerating, the webbing 26 that is applied to the body of the passenger is pulled. When the webbing 26 is pulled, the spool 20 rotates in the pull-out direction. The first lock base 52 is connected to the spool 20 via the main torsion shaft 32, and relative rotation of the first lock base 52 with respect to the spool 20 is restricted. Therefore, due to the spool 20 rotating in the pull-out direction, the first lock base 52 rotates in the pull-out direction, and moreover, the V gear 54 rotates in the pull-out direction.

When the rotational acceleration of the V gear 54 in the pull-out direction exceeds a predetermined magnitude, the W pawl 56 rotates relative to the V gear 54 due to inertia. Due thereto, the W pawl 56 engages with the ratchet teeth 70 that are formed at the sensor holder 68. Due thereto, rotation of the V gear 54 in the pull-out direction is restricted.

When the first lock base 52 rotates in the pull-out direction in the state in which rotation of the V gear 54 in the pull-out direction is restricted as described above, the pin 84 of the first lock pawl 60 is guided by the guide groove that is formed in the V gear 54 and is not shown in the drawings, and, due thereto, the first lock pawl 60 rotates around the shaft 210. When the first lock pawl 60 rotates in this way, as shown in FIG. 5A, the ratchet teeth 86 of the first lock pawl 60 mesh-together with the ratchet teeth 90 of the ratchet hole 88 that is formed in the leg plate 18.

Due thereto, rotation of the first lock base 52 in the pull-out direction is restricted. Relative rotation of the first lock base 52 with respect to the spool 20 is restricted as described above, and therefore, due to rotation of the first lock base 52 in the pull-out direction being restricted, rotation of the spool 20 in the pull-out direction is restricted. Therefore, in this state, the webbing 26 cannot be pulled-out from the spool 20, and the body of the passenger can be restrained by the webbing 26.

Further, the first lock pawl 60 is connected integrally to the second lock pawl 132 by the shaft 210. Therefore, when the first lock pawl 60 rotates as described above, the second lock pawl 132 rotates in the same direction as the first lock pawl 60. When the second lock pawl 132 rotates in this way, as shown in FIG. 5B, the ratchet teeth 136 of the second lock pawl 132 approach the inner peripheral portion of the circular hole 182 of the lock ring 180. However, as described above, in the initial state, the lock ring 180 is provided in a state in which the phase of the ratchet teeth 183 is offset from the phase of the ratchet teeth 90 of the ratchet hole 88 (the leg plate 18).

Therefore, in this state, there is a state in which the ratchet teeth 136 of the second lock pawl 132 can mesh-together with the ratchet teeth 183 of the lock ring 180, but the ratchet teeth 136 of the second lock pawl 132 are not meshed-together with the ratchet teeth 183 of the lock ring 180. Therefore, rotation of the second lock pawl 132 is not restricted. Due thereto, the first lock pawl 60, that is made integral with the second lock pawl 132 by the shaft 210, can rotate sufficiently, and the ratchet teeth 86 can reliably mesh-together with the ratchet teeth 90 of the ratchet hole 88.

(Operation of Force Limiter Mechanism 30)

In this state, when the rotational force, that is applied to the spool 20 due to the body of the passenger tensing (pulling) the webbing 26, exceeds the mechanical strength of the main torsion main body 38 of the main torsion shaft 32, the spool 20 rotates in the pull-out direction relative to the first lock base 52. Due thereto, torsional deformation arises at the main torsion main body 38. Moreover when the spool 20 rotates in the pull-out direction relative to the first lock base 52 in this way, the inner wall of the shaft accommodating portion 212 pushes and presses the shaft 210 so as to shear the shaft 210 in the pull-out direction. When the stress at this time concentrates at the reduced diameter portion 216 of the shaft 210, the reduced diameter portion 216 breaks.

Here, due to the abutment portion 214 abutting the outer peripheral portion of the shaft 210 from the take-up direction side, the shaft 210 moving in the take-up direction with respect to the spool 20 is suppressed. Therefore, when the shaft 210 is pushed and pressed in the pull-out direction by the spool 20, the shaft 210 does not move in the take-up direction. Therefore, shearing load in the pull-out direction from the spool 20 is sufficiently applied to the shaft 210. Due thereto, breakage is effectively brought about at the reduced diameter portion 216 of the shaft 210, and the connection between the shaft 210 and the first lock pawl 60 can be cancelled.

Moreover, as described above, when the spool 20 rotates in the pull-out direction from the state in which the ratchet teeth 86 of the first lock pawl 60 are meshed with the ratchet teeth 90 of the ratchet hole 88, the second lock base 124 rotates in the pull-out direction together with the spool 20. Due thereto, as shown in FIG. 6B, the ratchet teeth 136 of the second lock pawl 132 mesh-together with the ratchet teeth 183 of the lock ring 180. In this state, the rotational force of the spool 20 in the pull-out direction is transmitted via the second lock pawl 132 to the lock ring 180.

Here, as shown in FIG. 6B, when the lock portion 192 of the arm portion 190 at the FL pawl 186 is positioned within the engaged portion 184 of the lock ring 180, rotation of the lock ring 180 in the pull-out direction is restricted. In this state, in a case in which the rotational force of the spool 20 exceeds the sum of the mechanical strength of the main torsion main body 38 of the main torsion shaft 32 and the mechanical strength of the sub torsion main body 48 of the sub torsion shaft 42, the spool 20 rotates in the pull-out direction relative to the second lock base 124. Due thereto, the reduced diameter portion 218 breaks in the same way as the case of the reduced diameter portion 216. Due thereto, the connection between the shaft 210 and the second lock pawl 132 is cancelled.

When the spool 20 rotates further in the pull-out direction from this state, the spool 20 rotates in the pull-out direction while torsionally deforming the main torsion main body 38 and the sub torsion main body 48. The webbing 26 is pulled-out from the spool 20 by an amount corresponding to the amount of torsional deformation of the main torsion main body 38 and the sub torsion main body 48. Accordingly, the body of the passenger to which the webbing 26 is applied can move inertially toward the vehicle front by an amount corresponding to the length of the webbing 26 that is pulled-out from the spool 20, and moreover, a portion of the force by which the body of the passenger pulls the webbing 26 is provided to and absorbed by the torsional deformation of the main torsion main body 38 and the sub torsion main body 48.

On the other hand, the ECU judges the physique of the passenger on the basis of the electric signal from the physique detecting unit. When the ECU judges that the passenger has a small physique, the ECU causes the gas generator 200 to actuate. When the gas generator 200 actuates, the piston 198 moves due to the gas pressure, and the piston 198 pushes and presses the upper end portion 191 of the arm portion 190 of the FL pawl 186. The FL pawl 186 rotates by being pushed and pressed by the piston 198, and, due thereto, the lock portion 192 of the FL pawl 186 comes-out from the engaged portion 184 of the lock ring 180, and the restricting of the rotation of the lock ring 180 is cancelled.

In this state, when the spool 20 rotates in the pull-out direction, as shown in FIG. 7B, the second lock base 124 rotates in the pull-out direction, and accordingly, the lock ring 180 rotates in the pull-out direction. In this way, due to the second lock base 124 rotating in the pull-out direction together with the spool 20, torsional deformation does not arise at the sub torsion main body 48 of the sub torsion shaft 42. Therefore, in this state, if the rotational force of the spool 20 exceeds the mechanical strength of the main torsion main body 38 of the main torsion shaft 32, the spool 20 rotates in the pull-out direction while torsionally deforming the main torsion main body 38. Therefore, in this state, the webbing 26 is pulled-out from the spool 20 by a low tensile (pull) load, and the tensile load that is absorbed also is smaller.

Here, in the present webbing take-up device 10, the structure for interlocking the second lock pawl 132 with the first lock pawl 60 is merely the shaft 210, and it suffices also for the switching between the restricting of rotation of the lock ring 180 and the cancelling of this restricting to be carried out merely by moving the piston 198 by the gas pressure generated at the gas generator 200. In this way, by a relatively simple structure, it is possible to switch between a mode that brings about torsional deformation at the sub torsion main body 48 of the sub torsion shaft 42, and a mode that does not bring about torsional deformation at the sub torsion main body 48 of the sub torsion shaft 42.

What is claimed is:

1. A webbing take-up device comprising:
   a spool that is provided at an inner side of a frame and that takes up a webbing;
   a first lock base configuring a first lock mechanism that is provided, so as to be able to rotate relative to the spool, at one end side of the spool in an axial direction of the spool;
   a first energy absorbing member that includes a first body at which torsional deformation arises when a rotational force, which is applied to the spool, exceeds a predetermined first value, and that is connected at an inner side of the spool, in a state in which relative rotation of the first energy absorbing member with respect to the spool is restricted, and that is connected at the one end side of the spool in the axial direction, in a state in which relative rotation of the first energy absorbing member with respect to the first lock base is restricted;
   a first lock pawl configuring the first lock mechanism, at whose distal end ratchet teeth are formed and that is provided at the first lock base so as to be able to rotate around a base end side of the first lock pawl, and, by rotating, the first lock pawl meshes with ratchet teeth formed at the frame and restricts rotation of the first lock base in a pull-out direction;
   a second lock base configuring a second lock mechanism, that is provided at another end side of the spool in the axial direction so as to be able to rotate relative to the spool;
   a second energy absorbing member that includes a second body at which torsional deformation arises when the rotational force, which is applied to the spool, exceeds a predetermined second value, and that is connected at the inner side of the spool in a state in which relative rotation of the second energy absorbing member with respect to the spool is restricted, and that is connected at the another end side of the spool in the axial direction in a state in which relative rotation of the second energy absorbing member with respect to the second lock base is restricted;
   a lock ring configuring the second lock mechanism that is provided rotatably at an outer side of the second lock base, and at whose inner peripheral portion ratchet teeth are formed;
   a second lock pawl configuring the second lock mechanism at whose distal end ratchet teeth are formed and that is provided at the second lock base so as to be able to rotate around a base end side of the second lock pawl, the second lock pawl being configured to be able to mesh with the ratchet teeth of the lock ring by the second lock pawl rotating in a same direction as a rotation direction of the first lock pawl at a time when the first lock pawl meshes with the ratchet teeth of the frame, and the second lock pawl causing the lock ring to rotate in the pull-out direction integrally with the second lock base by the second lock pawl meshing with the ratchet teeth of the lock ring;
   a switching unit that has a restricting member restricting rotation of the lock ring in a state of being engaged with the lock ring, and that, by actuating, switches a state of engagement of the restricting member with respect to the lock ring; and
   a connecting member that is provided so as to pass through the spool in a direction along a central axis of the spool, and that connects the first lock pawl and the second lock pawl integrally,
   due to the spool rotating relative to the first lock base in the pull-out direction, a first lock pawl side of the connecting member breaking, and,
   due to the spool rotating relative to the second lock base in the pull-out direction, a second lock pawl side of the connecting member breaking.

2. The webbing take-up device of claim 1, wherein: the lock ring is set in a state in which phase of the ratchet teeth of the lock ring is offset with respect to phase of the ratchet teeth of the frame, and in a state in which the second lock pawl is rotated interlockingly with the first lock pawl, a tooth of the ratchet teeth of the second lock pawl is positioned between adjacent teeth of the ratchet teeth of the lock ring.

3. The webbing take-up device of claim 2, further comprising an abutment portion that is provided at at least one of the one end side or the another end side of the spool, that abuts the connecting member from a side of the take-up direction that is opposite a pull-out direction, and that restricts movement of the connecting member in the take-up direction.

4. The webbing take-up device of claim 1, further comprising an abutment portion that is provided at at least one of the one end side or the another end side of the spool, that abuts the connecting member from a side of the take-up direction that is opposite a pull-out direction, and that restricts movement of the connecting member in the take-up direction.

* * * * *